UNITED STATES PATENT OFFICE.

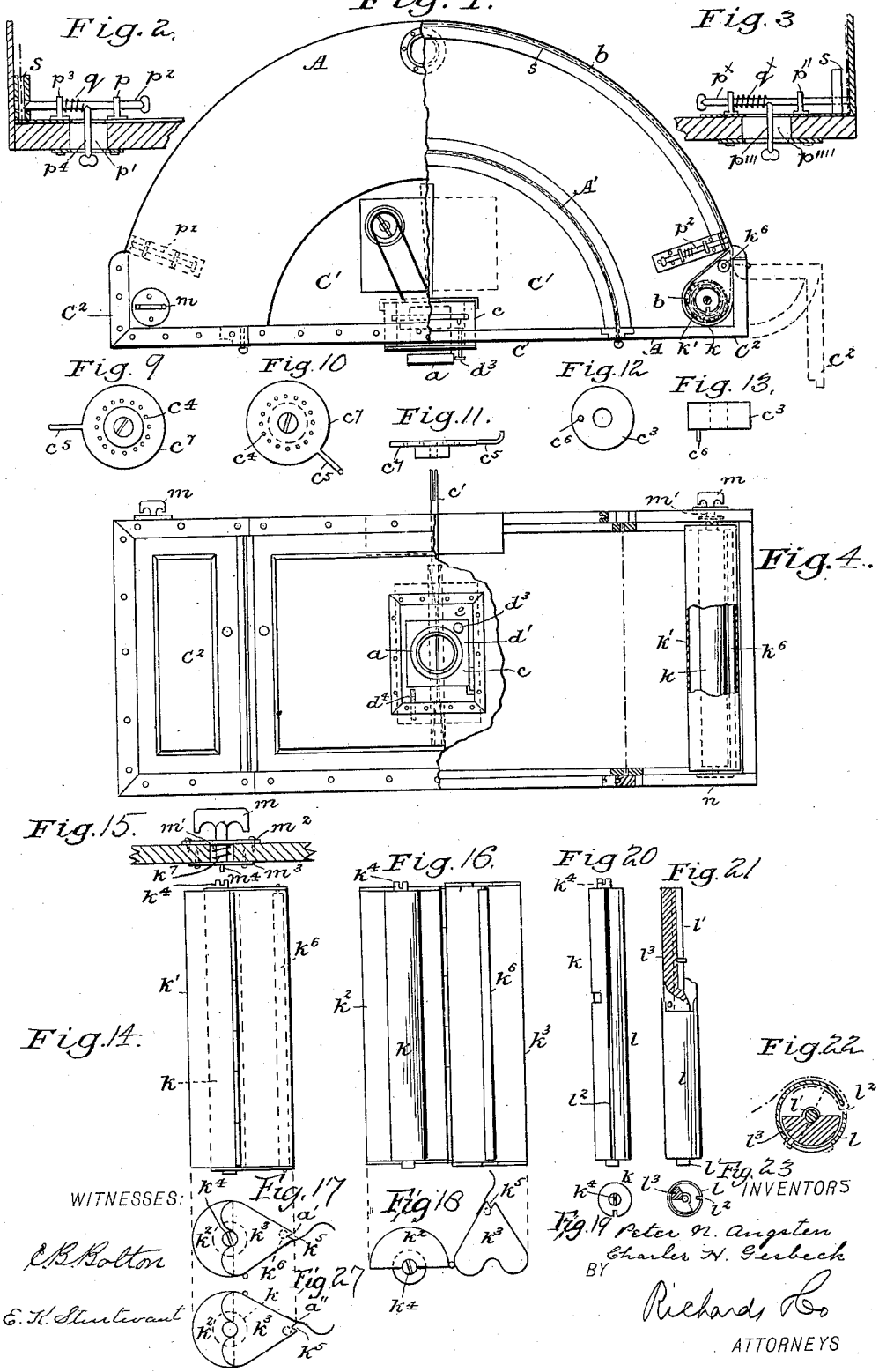

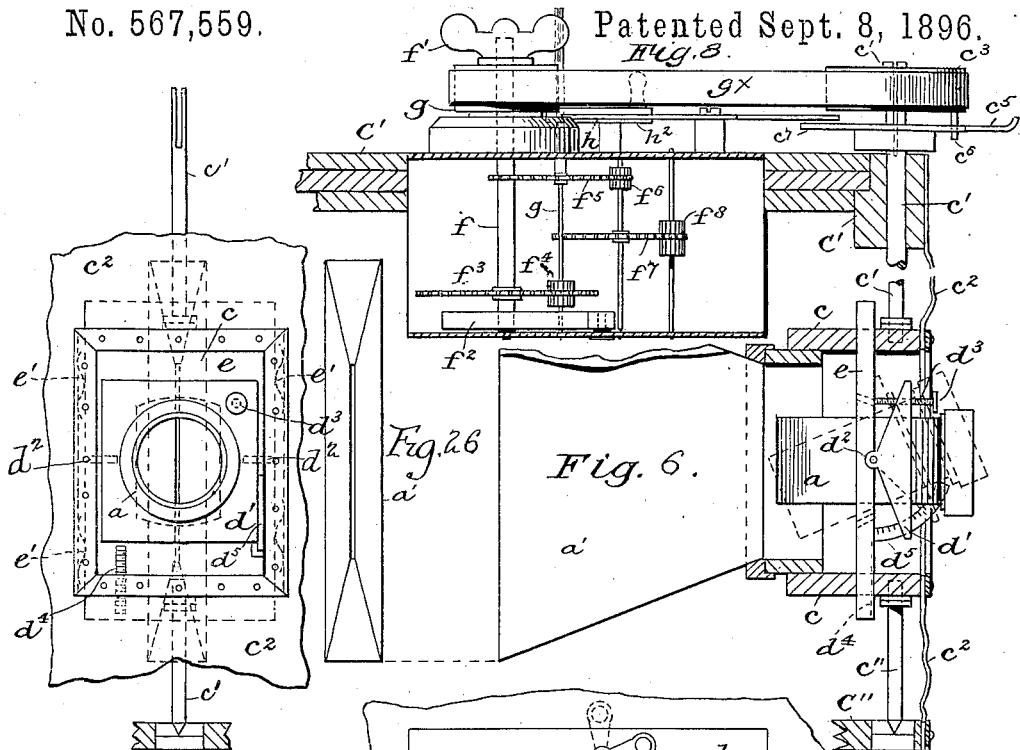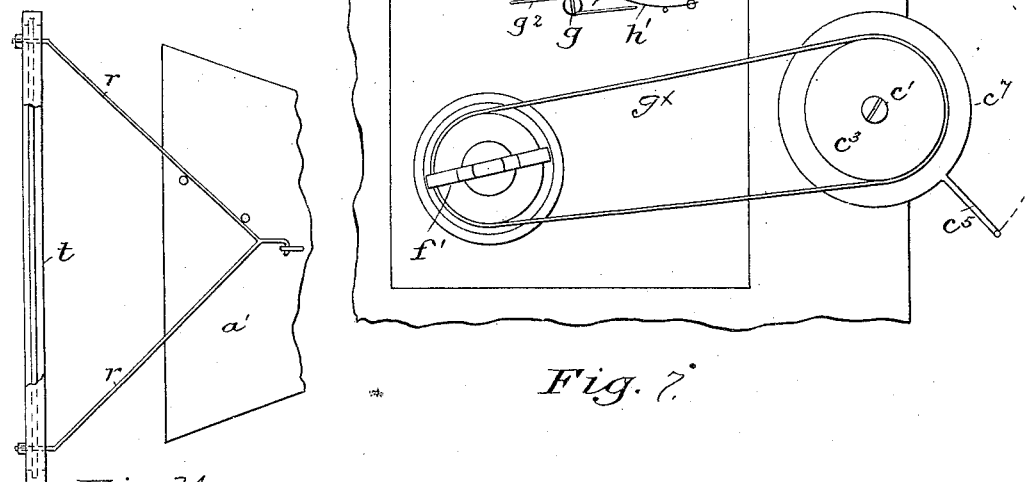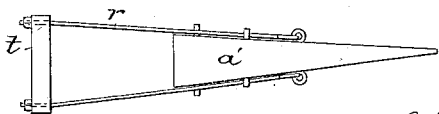

PETER N. ANGSTEN AND CHARLES H. GESBECK, OF CHICAGO, ILLINOIS.

PANORAMIC CAMERA.

SPECIFICATION forming part of Letters Patent No. 567,559, dated September 8, 1896.

Application filed August 20, 1895. Serial No. 559,919. (No model.)

*To all whom it may concern:*

Be it known that we, PETER N. ANGSTEN and CHARLES H. GESBECK, citizens of the United States, residing at Chicago, Cook county, Illinois, have invented certain new and useful Improvements in Panoramic Cameras, of which the following is a specification.

This invention relates to photographic cameras, and particularly to that class of photographic cameras designed to take a continuous picture of the entire horizon, or such part of it as may be desired.

The object of the invention is to construct a camera of this kind which shall be simple and economical in construction and efficient in operation.

Our invention comprises the novel features and combination thereof hereinafter described and particularly claimed.

In the accompanying drawings, Figure 1 is a plan view of our improved camera. Figs. 2 and 3 are details of the film-catcher. Fig. 4 is a front view, partly in section, of the camera. Figs. 5 and 6 are, respectively, front and side elevations of the lens. Figs. 7 and 8 are, respectively, plan and sectional views of the release and driving mechanism. Figs. 9, 10, 11, 12, and 13 are detail views showing the manner of mounting the driving-pulley upon its shaft. Figs. 14, 15, and 16 are detail views of the film-casing and the manner of holding the same in place. Fig. 17 is a detail plan view of one of the film-casings. Fig. 18 is a similar view showing the casing open. Fig. 19 shows in plan and section the film-roller. Figs. 20, 21, 22, and 23 are detail views of the film-spools; and Figs. 24 and 25 are details of focusing-frame, showing manner of attaching same. Fig. 26 is a rear view of the flaring frame carried by the lens-mount. Fig. 27 is a detail view of the film-casing, which, together with that shown in Fig. 17, forms the pair used in the camera.

Referring to the drawings by letter, A represents the frame of the camera. This is made semicircular in plan, with a portion having a diameter equal to about one-half that of the frame cut from the center. The inner side of the frame consists of a sliding shade A', adapted to be withdrawn when desired, and against the outer side of the frame, on the inside thereof, rests the film $b$, as will be presently described. The ends of the frame are provided with doors $C^2$, the purpose of which will more fully hereinafter appear. The front of the camera consists of a removable frame C, which fits across the opening between the ends of frame A. It is provided with a removable top C' and a removable bottom C'', arranged to cover the segmental opening between the frame A' and frame C. A smaller frame $c$ is pivotally mounted within frame C by means of vertical pivot-rods $c'c''$, bearing in frame C and allowing frame $c$ an easy horizontal rotary motion.

$a$ represents the lens-mount containing suitable lenses and passing through and firmly attached to a wedge-shaped swing-board $d'$, the latter having the apex of the wedge horizontally pivoted to a front board $e$ by any suitable bearings $d^2$. The front board $e$ is loosely held in frame $c$ by means of springs $e'$, whereby the former may be raised or lowered for the purpose of taking more or less foreground in the picture. A thumb-screw $d^3$ passes loosely through one end of the wedge-shaped swing-board $d'$ and engages with the front board $e$, whereby the lens may be pointed up or down, as desired, as shown in Fig. 6 of the drawings.

It will be found convenient, if not necessary, to attach to the front board a graduated scale $d^4$ for the purpose of measuring the number of points the front board is raised or lowered, each point indicating a certain distance of removal of foreground from a designated point in the scale, and $d^5$ indicates a similar scale attached to the front board indicating the angle of elevation or depression given lens-mount by the elevation or depression of the swing-board. The space between frame $c$ and frame C is closed against the passage of light by means of a flexible covering $c^2$, which will not interfere with the turning of frame $c$ upon its pivots. A flat metal frame $a'$, of the shape of a truncated pyramid, is fixed at its small end to the lens-mount, the larger end extending nearly to the film. A ray of light, therefore, through the lens is cast upon the film in a vertical line, and the same intensity of exposure is assured throughout all parts of the film.

An important feature of our device is the arragement for rotating the lens upon its axis and securing a uniform exposure of each part of the film. We accomplish this result by connecting suitable mechanism, such as clockwork, with the axis upon which the lens is mounted. It is to be understood that any mechanism used in the place of clockwork would be but a mere detail change and not outside of the spirit of our invention. In the drawings we have shown an upright shaft $f$, bearing in the top $C'$, provided with a key or handle $f'$ for rotating the same. An ordinary mainspring $f^2$ is attached to the shaft, the spring being wound and unwound by the rotating of the shaft. By means of the usual intermediate gearing, gear-wheel $f^3$, pinion $f^4$, gear-wheel $f^5$, pinion $f^6$, gear-wheel $f^7$, and pinion $f^8$, a shaft $g$, also bearing in top $C'$, is rotated. A pulley $g'$ is attached to shaft $f$, and a band $g^\times$ connects this pulley with a pulley $c^3$, attached to the upper pivotal axis $c'$, whereby when shaft $f$ is rotated by spring $f^2$ the lens-mount $d$ will be rotated from left to right or right to left. The upper end of shaft $g$, which extends above the pulley-band, carries a suitable fan $g^2$, whereby the revolutions of the driving-shaft may be conveniently timed.

In Figs. 9, 10, 11, 12, 13 are illustrated in detail the method of attaching the pulley $c^3$ to its shaft. It is frequently desirable to change the relative positions of pulleys $g'$ and $c^3$ to each other without slipping the band on either, as, for instance, if the clockwork when wound up does not bring the lens in the proper position. A face-plate $c^7$, Figs. 9, 10, and 11, is fixed to the upper end of shaft $c'$ and has a circular row of holes $c^4$ perforated therein around the center of the plate. A suitable projecting handle $c^5$ is also fixed thereto. The pulley $c^3$ has formed on its under side a projecting pin $c^6$, adapted to fit into the holes $c^4$. The pulley $c^3$ may then be lifted slightly from the face-plate $c^7$ and the latter turned to any desired position.

The rotation of the lens is governed by means of the apparatus shown in Fig. 7, in which $h$ represents a lever pivoted intermediate of its extremities and having a notch $h^\times$ or offset cut in one end and adapted to rest against shaft $g$ to prevent its rotation. The handle $c^5$ is long enough to strike against the end of the lever $h$ opposite that engaging with shaft $g$, and when shaft $c'$ rotates so as to bring handle $c^5$ on that side the handle strikes the face of the lever and applies the brake above described to the shaft $g$. A suitable spring $h'$ serves to normally hold lever $h$ away from shaft $g$, and a pivoted button $h^2$ is arranged to be pushed against lever $h$ to hold the latter against shaft $g$ whenever desired. When the button is pushed out of engagement with the lever, shaft $g$ will revolve and rotate the lens.

For the purpose of facilitating the focusing of the lens we have constructed the device illustrated in Figs. 24 and 25, in which $t$ is a suitably-shaped frame carrying a piece of film or ground glass. By means of convenient supports $r$ $r$ it is hooked into an eye on frame $a'$ and supported directly opposite the enlarged end thereof. The back of the camera is removed, care being taken that shutter $A'$ is in place in order that the film will be protected and the above-described frame is put in place. The lens is then rotated and focused by using the various means heretofore described.

Each of the ends of the camera is provided with a door $C^2$, and said door is provided with a shelf $n$, or other suitable means for supporting a removable roll or spool of film $k$, mounted in a case $k'$. The case consists of a hollow metal body divided longitudinally into two parts hinged together. One half, $k^2$, is semicircular in shape, whereas the other half, $k^3$, is wedge-shaped, and its top and bottom overlaps the top and bottom of the half $k^2$ for the purpose of excluding light from the case when the frame is closed. A spool K is mounted in the case and has wound upon it the film to be used in the camera. Its upper end projects from the case and has a slit $k^4$ cut in it, for a purpose which will be hereinafter explained. In the apex of the wedge-shaped half $k^3$ of the casing is cut a slit $k^5$, running lengthwise of the case, through which the film may be unrolled from the spool in the case. A roller $k^6$ is journaled near the slit and facilitates the drawing of the film through the slit. A key $m$ is placed in the top of the camera directly over the film-spool.

The spools $k$ consist of a hollow cylinder $l$, mounted upon a shaft $l'$ and having a longitudinal slot $l^2$ cut therein. Fixed to shaft $l'$ is a lug or enlarged portion $l^3$, which nearly occupies the space between the shaft and the sides of the cylinder in one half thereof. To fasten the film upon the spool, the end of the film is inserted in slot $l^2$ and shaft $l'$ turned to clamp the film against the side of the cylinder by means of lug $l^3$. A hole $m'$ passes through the top of the camera, and over the upper and under side thereof is located a plate $m^2$ $m^3$, respectively, fastened to the cover. Through these plates key $m$ passes. Its lower end has a lug $m^4$ formed thereon, adapted to fit into slit $k^4$ on shaft $l'$ when the key is held down, as it normally is, by a spring $k^7$, located between plates $m^2$ and $m^3$ and attached to the key. When it is desired to remove the film, it is wound upon spool $k$ and the key $m$ is raised out of engagement therewith. The film-spool and its casing are then removed, and, if desired, replaced by another. The continuous film $b$ is rolled on a spool on one side of the camera and wound up on the spool on the other end of the camera as used, and the catches illustrated in Figs. 2 and 3 are employed for determining when an exposed film has been completely wound up and a new film put in place. In this arrangement $p$ $p$ represents two standards, one on each side of a hole $p'$ in the bottom of the camera.

A rod $p^2$ is supported in bearings $p^3$ $p^3$ in the standards and slides back and forth therein. A pin $p^4$ is fixed to rod $p^2$ intermediate of the standards and passes through the hole $p'$, whereby, by means of pin $p^4$, rod $p^2$ may be moved back and forth from the outside of the camera. The rod $p^2$ is sharpened to form a punch. A spring $q$ serves to hold the punch normally away from the film. At the other side of the camera a catch-rod $p^\times$, arranged to slide in standards $p''$, is pressed by the spring $q^\times$, so as to normally engage the film. This rod has a handle $p'''$, passing through the opening $p''''$, by which the catch may be released when caught into the film. The film runs in grooves $s$ $s$ in the top and bottom of the camera, and when in position for an exposure is punched at one end by the sharpened rod. This rod is normally held away from the film by its spring. When the exposure is completed, the film is wound up on the spool on the opposite end of the camera, and when the hole punched therein comes opposite to the blunt rod, which is normally held against the film by the action of its spring, the rod will slide into the hole, and thus indicate to the operator that all that part of the film which has been exposed has been wound up.

The semicircular front of the camera, between the lens and the film, consists of a slide $A'$, of usual construction, except that the same is semicircular in shape and serves as the front of the frame when the part holding the lens is removed.

The operation of the device is substantially as follows: The lens is focused in the usual manner, aided largely by the improved construction heretofore described, and turned so that the exposure will be on the extreme end of the film. Prior to this, of course, the clockwork has been wound and a film inserted in position. The slide is then drawn and button $h^2$ pressed. This releases the clockwork and the latter turns the lens steadily and uniformly on its pivot until the exposure reaches the other end of the camera, when handle $c^5$ strikes against lever $h$ and stops the movement of the clockwork. The film is then wound up upon its spool and removed and developed in the usual manner.

Having thus described our invention, what we claim is—

1. In combination, the casing, the lens and its rotary carrier, the motor mechanism, the brake therefor, the connection between the motor mechanism and the lens-carrier and means moving with the lens-carrier to control the brake, said means contacting with the brake device only in the final movement of the carrier substantially as described.

2. In a panoramic camera, the combination with the casing, of a lens with its rotary carrier, a motor mechanism, a connection therefrom to the lens-carrier, a brake-lever $h$, a disk on the shaft of the lens-carrier and an arm or projection on the disk to operate the brake, substantially as described.

3. In a camera, the combination of a horizontally-swinging lens-holding frame, a front board adjustably held therein, a swing-board pivotally mounted upon said front board, to swing vertically and a lens carried by said swing-board, substantially as described.

4. In a camera, the combination of a lens mounted upon a vertically-pivoted shaft, a face-plate having a row of holes around the center thereof fixed to said shaft, a pulley having a pin formed thereon adapted to be inserted in one of said holes, and means for rotating said pulley, said pin-and-hole connection enabling the position of the lens to be adjusted without moving the driving mechanism and in relation thereto substantially as described.

5. In a camera, the combination of the casing, the film-holding case, the spool therein having its journals extending beyond the film-case, and the key extending through the camera-case and engaging the spool-journal removably, whereby the key may be used to wind the spool and also as a detachable holding means therefor, said key being permanently mounted in the frame and having the spring for pressing the same normally inward substantially as described.

6. In a camera, having a film adapted to be unwound from a spool at one end of the camera and wound upon a spool at the other end of the camera, the combination of a punch normally held away from the film but adapted to be driven therethrough, at the end of the camera from which the film is unwound, and a catch normally pressed against the film at the other end of the camera, both the punch and the catch comprising radially-sliding rods with finger-pieces extending to the outside of the casing for operating them substantially as and for the purpose set forth.

7. A film-spool comprising a hollow cylinder, having a longitudinal slot therein, and an inner shaft carrying an enlarged portion or lug of segmental form projecting radially from the shaft and adapted to clamp the film to the inner side of said cylinder, as and for the purpose set forth.

8. In combination, the lens-mount, the flaring frame $a'$ extending therefrom and the frame $t$ with its arms $r$ connected to the flaring frame, substantially as described.

In witness whereof we have hereunto set our hands in presence of two witnesses.

PETER N. ANGSTEN.
CHARLES H. GESBECK.

Witnesses:
BARNARD J. BAUMER,
OTTO P. KALVELAGE.